Oct. 31, 1939.                H. A. WHEELER                 2,177,761
                        M-DERIVED BAND-PASS FILTER
                       Filed Sept. 15, 1938        3 Sheets—Sheet 1
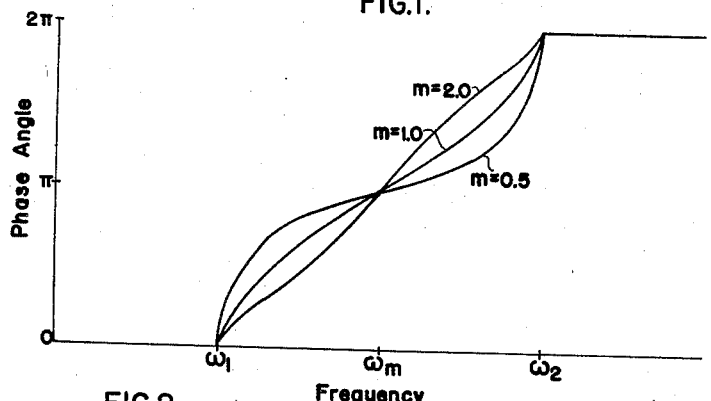
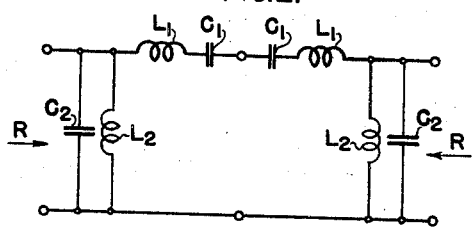
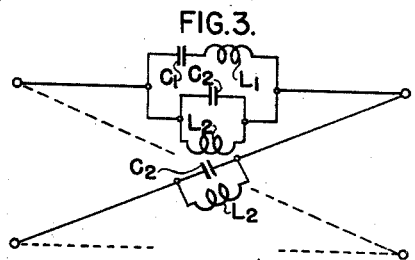
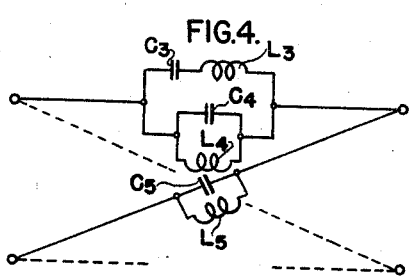
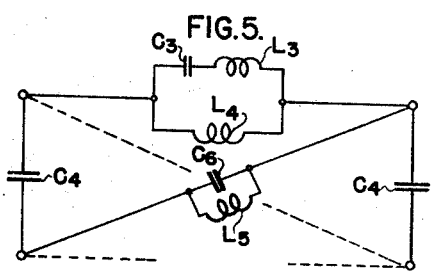
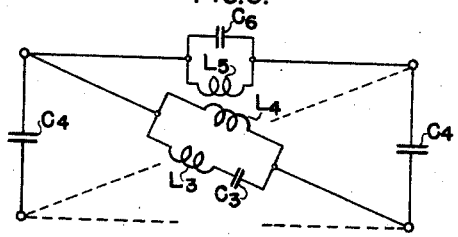
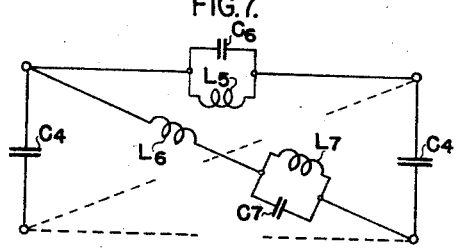
INVENTOR
HAROLD A. WHEELER
BY *Laurence B Dodds*
ATTORNEY Oct. 31, 1939.    H. A. WHEELER    2,177,761
M-DERIVED BAND-PASS FILTER
Filed Sept. 15, 1938    3 Sheets-Sheet 2
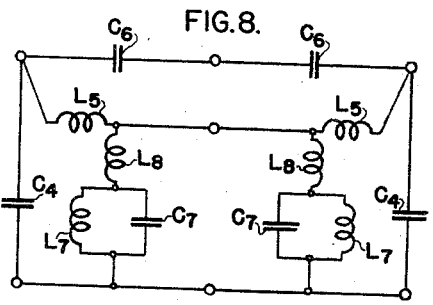
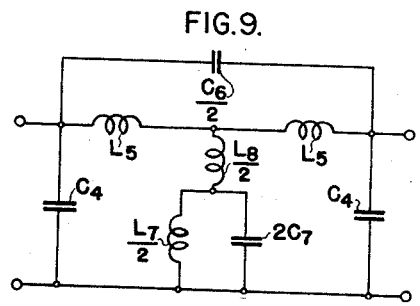
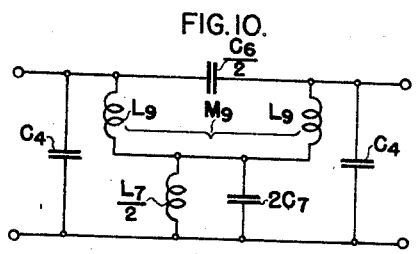
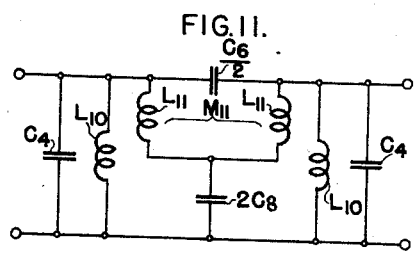
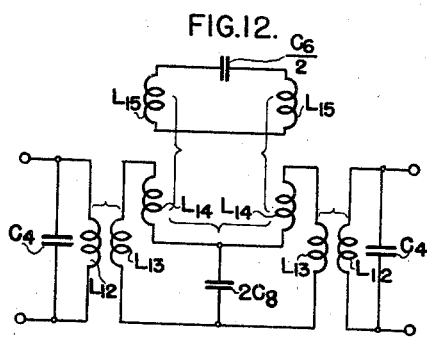
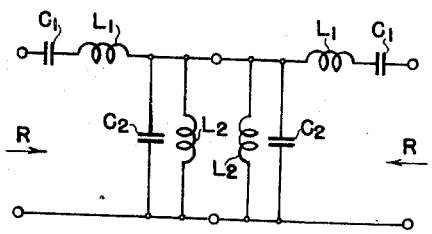
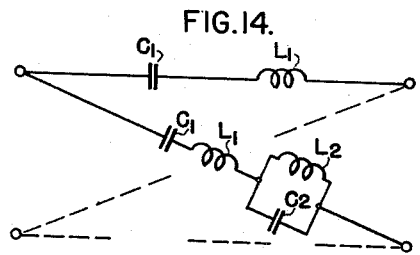
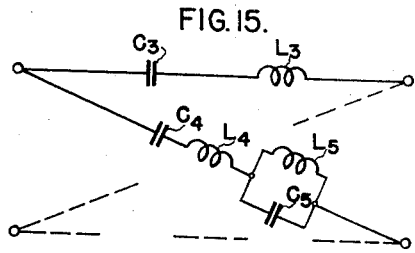
INVENTOR
HAROLD A. WHEELER
BY Laurence B. Dodds
ATTORNEY Oct. 31, 1939.                H. A. WHEELER                2,177,761
                       M-DERIVED BAND-PASS FILTER
                     Filed Sept. 15, 1938      3 Sheets-Sheet 3
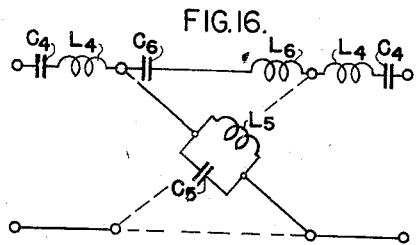
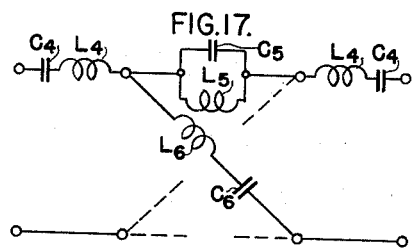
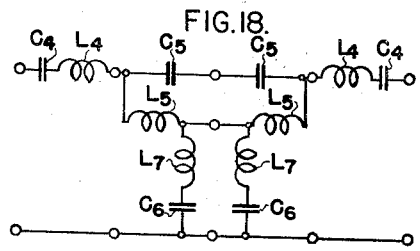
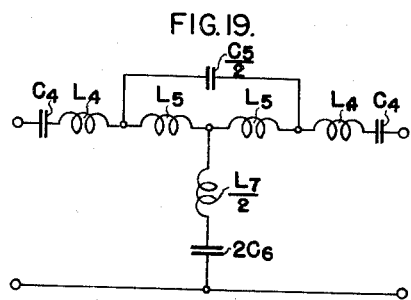
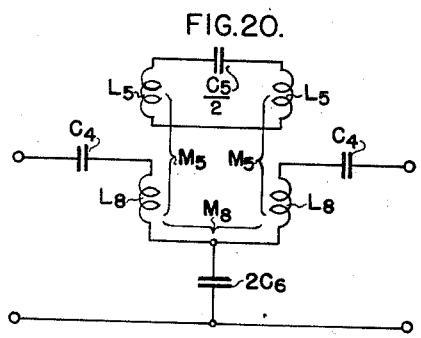
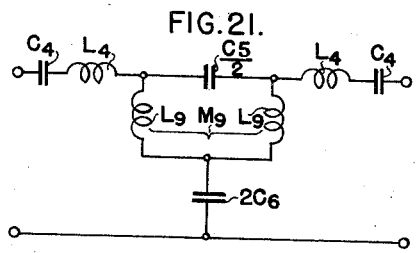
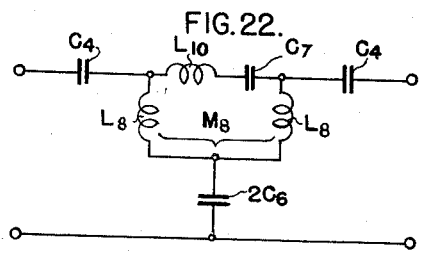
INVENTOR
HAROLD A. WHEELER
BY *Laurence B. Dodds*
ATTORNEY Patented Oct. 31, 1939

2,177,761

UNITED STATES PATENT OFFICE 2,177,761

M-DERIVED BAND-PASS FILTER

Harold A. Wheeler, Great Neck, N. Y., assignor to Hazeltine Corporation, a corporation of Delaware Application September 15, 1938, Serial No. 230,015

7 Claims. (Cl. 178—44)

This invention relates to $m$-derived band-pass filters adapted for unbalanced operation, in which the parameter of derivation $m$ is greater than unity.

Filter sections which are $m$-derived from a constant-$k$ prototype have been commonly used in filter design. Such an $m$-derived section has the characteristics that its image impedances are equal to those of its constant-$k$ prototype while its attenuation and phase-delay characteristics are different from those of its prototype. Such filter sections can be connected to constant-$k$ sections or half-sections without transition losses at the junction points and the combined multisection filter has for its total attenuation and phase delay the sum of the attenuations and phase delays of the invidivdual filter components. This permits great flexibility in the design of multisection networks to meet given over-all requirements. $m$-derived filter sections of all types are available in balanced networks; that is, in networks symmetrical with respect to ground or an electrical neutral. Many electrical circuits, however, are unbalanced, that is, a point other than the neutral point of the circuit is grounded. In such circuits an excessive number of circuit elements are required to convert them to balanced networks. It is, therefore, desirable to have available unbalanced $m$-derived filter sections of all types. However, unbalanced band-pass $m$-derived filter sections in which $m$-is greater than unity have not been available. An $m$-derived band-pass filter section having $m$ greater than unity has the characteristic of a maximum phase slope at the mean frequency of the band, which characteristic is generally opposite to that of filter sections of constant-$k$ or $m$-derived sections in which $m$ is less than unity, and such a filter section is, therefore, of great utility in correcting for phase distortion in a confluent filter. In fact, one $m$-derived filter section having $m$ greater than unity may be made to compensate for the phase departure from linearity in several sections having $m$ equal to or less than unity over most of the pass band of a confluent filter.

An $m$-derived filter section is generally developed from the lattice network equivalent of its constant-$k$ prototype. If an unbalanced $m$-derived filter section is desired, it is generally derived from its $m$-derived lattice network equivalent. However, if this procedure is attempted with a band-pass filter section as a prototype, circuit elements having negative reactances are required to produce the equivalent unbalanced filter section after the $m$-derivation. While mutual inductance may be utilized to furnish a negative inductance, where required in some transformations, negative capacitance is also required in making the same transposition in a band-pass filter section, and negative capacitance is not physically realizable. Therefore, no method has been known previously by which the transition from a balanced or lattice type $m$-derived band-pass filter section, in which $m$ is greater than unity, could be made to an unbalanced network of type, such as the ladder or bridged-T.

It is an object of the present invention to provide an $m$-derived band-pass filter section adapted for unbalanced operation in which $m$ is greater than unity.

It is another object of the invention to provide an $m$-derived band-pass filter section adapted for unbalanced operation and presenting constant-$k$ mid-series image impedance at its terminals and in which $m$ is greater than unity.

It is another object of the invention to provide an $m$-derived band-pass filter adapted for unbalanced operation and presenting a constant-$k$ mid-shunt image impedance at both pairs of its terminals, in which $m$ is greater than unity.

In accordance with the present invention, there is provided an $m$-derived band-pass filter section in which $m$ is greater than unity and which is derived from a given band-pass constant-$k$ prototype. The equivalent lattice circuit of the given prototype is obtained and its elements are replaced by the corresponding $m$-derived elements in the usual manner. The transformation of the balanced $m$-derived lattice network to its equivalent unbalanced network is accomplished by interchanging the inner and outer arms of the lattice in order that negative reactance elements will not be required in the derived unbalanced filter section, thus enabling each of its components to be physically realized. This interchanging of the inner and outer arms of the lattice network in no way changes the electrical characteristics of the resulting unbalanced filter circuit except that the polarity of its input and output circuits are reversed with respect to each other. For most purposes, this does not affect its utility as a filter section in a confluent filter.

For a better understanding of the invention, together with other and further objects thereof, reference is had to the following description taken in connection with the accompanying drawings, and its scope will be pointed out in the appended claims.

Fig. 1 of the drawings illustrates a phase-frequency characteristic of an $m$-derived band-pass filter section for several values of $m$; Fig. 2 is a circuit diagram of a constant-$k$ prototype of the band-pass filter section of the invention having mid-shunt termination; Fig. 3 is a circuit diagram of the lattice equivalent of the circuit of Fig. 2; Figs. 4 and 5 are circuit diagrams of further equivalent modifications of the circuit of Fig. 3; Fig. 6 shows the circuit of Fig. 5 with the inner and the outer arms of the lattice interchanged; Fig. 7 is a circuit diagram of a further modification of the circuit of Fig. 6; Fig. 8 is a circuit diagram of an unbalanced network which is the electrical equivalent of the circuit of Fig. 7; Figs. 9–12, inclusive, are circuit diagrams of further modifications of the unbalanced circuit of Fig. 8; Fig. 13 represents the constant-$k$ prototype of the band-pass filter section of the invention having mid-series termination; Fig. 14 is a circuit diagram of the lattice equivalent of the circuit of Fig. 13; Figs. 15 and 16 are circuit diagrams of further modifications of the circuit of Fig. 14; Fig. 17 shows the circuit of Fig. 16 with the inner and outer arms of the lattice interchanged; Fig. 18 is a circuit diagram of an unbalanced network which is the equivalent of the circuit of Fig. 17; Figs. 19–22, inclusive, are circuit diagrams of further modifications of the unbalanced circuit of Fig. 18.

Referring now more specifically to the drawings, in Fig. 1 there is shown the phase-delay frequency characteristics of an $m$-derived band-pass filter section for various values of $m$. It is seen that the curve of a filter having $m=2$ provides a substantially different type of characteristic over the pass band than the curves of filters having $m=1$ or $m=0.5$.

As stated above, a severe limitation has existed on the design of band-pass filters, inasmuch as an unbalanced $m$-derived band-pass filter, in which $m$ is greater than unity, has not been available. The development of such a filter section, presenting constant-$k$ mid-shunt image impedance at its terminals, may be best explained by reference to Figs. 2–12, inclusive. Fig. 2 shows the constant-$k$ prototype of the desired filter section. Each half-section of this filter comprises a mid-series arm consisting of a series-connected inductance $L_1$ and capacitance $C_1$ and a mid-shunt arm comprising a parallel-connected inductance $L_2$ and capacitance $C_2$. This filter is of the constant-$k$ type; that is, the impedance $Z_1$ comprising reactance elements $L_1$, $C_1$ is, in the ideal case, pure reactance of any form and the impedance $Z_2$ comprising reactance elements $L_2$, $C_2$ is so related to $Z_1$ that the product $Z_1Z_2$ is constant. The filter presents a constant-$k$ mid-shunt image impedance R at each of its pairs of terminals. The following formulae apply to the circuit of Fig. 2:

$$C_1 = \frac{\omega_2 - \omega_1}{\omega_1\omega_2 R} \qquad C_2 = \frac{1}{(\omega_2 - \omega_1)R}$$
$$L_1 = \frac{R}{\omega_2 - \omega_1} \qquad L_2 = \frac{(\omega_2 - \omega_1)R}{\omega_1\omega_2} \tag{1}$$

$$R = \sqrt{\frac{L_1}{C_2}} = \sqrt{\frac{L_2}{C_1}} \tag{2}$$

$$\omega_m = \sqrt{\omega_1\omega_2} = \frac{1}{\sqrt{C_1L_1}} = \frac{1}{\sqrt{C_2L_2}} \tag{3}$$

where $\omega_1$ and $\omega_2$ are respectively the lower and upper cutoff frequencies of the filter and $\omega_m$ is the mean frequency of the pass band of the filter, all expressed in terms of angular velocity.

The circuit of Fig. 2 can be replaced by the lattice network of Fig. 3 which is in all respects the electrical equivalent of the circuit of Fig. 2. This network comprises in each of the outer arms a series branch comprising elements $L_1$, $C_1$ which is in parallel with inductance $L_2$ and capacitance $C_2$ and comprises in each of its inner arms inductance $L_2$ and capacitance $C_2$ in parallel. The circuit of Fig. 4 is similar to that of Fig. 3 and differs therefrom only in that the circuit values in the lattice arms have been $m$-derived without changing the image impedance presented at the terminals; that is, the impedance of the outer arm of the lattice of Fig. 3 has been multiplied by the factor $m$ and the inner arm by the factor $1/m$. The condenser elements $C_1$, $C_2$ of Fig. 3 are thus replaced by elements $C_3$, $C_4$, and $C_5$, the values of which are modified in accordance with the $m$-derivation, while inductance elements $L_1$ and $L_2$ of Fig. 3 have been replaced by inductances $L_3$, $L_4$, and $L_5$ similarly modified in value. The following formulae apply to the circuit of Fig. 4:

$$C_3 = \frac{C_1}{m} \qquad C_4 = \frac{C_2}{m} \qquad C_5 = mC_2$$
$$L_3 = mL_1 \qquad L_4 = mL_2 \qquad L_5 = \frac{L_2}{m} \tag{4}$$

The circuit of Fig. 5 is identical with that of Fig. 4 except that the shunt capacitance which is common to both arms has been replaced by condensers $C_4$, $C_6$ connected respectively across the input and output pairs of terminals. Since, in the instant case $m>1$ and $C_4<C_5$, this is made possible. The following formulae apply to the circuit of Fig. 5:

$$C_6 = C_5 - C_4 = \left(m - \frac{1}{m}\right)C_2 = \frac{m^2-1}{m}C_2 \tag{5}$$

An equivalent ladder or bridged-T network; that is, an equivalent unbalanced network, cannot be found with only positive values of capacitance for the circuit of Fig. 5. Therefore, in order to allow a transition from the balanced or lattice network of Fig. 5 to an unbalanced network, the inner arms and the outer arms of the lattice are interchanged as shown in Fig. 6. This interchange in no way affects the characteristics of the circuit except that the polarity of its input and output circuits are reversed with respect to each other. The circuit of Fig. 7 is equivalent to that of Fig. 6 except that the reactive constants of the cross arm of the lattice have been transformed to develop a series inductance element. The following formulae apply to the circuit of Fig. 7:

$$C_7 = C_3\left(1 + \frac{L_3}{L_4}\right)^2 = \frac{C_1}{m}\left(1 + \frac{L_1}{L_2}\right)^2$$
$$L_6 = \frac{L_3L_4}{L_3+L_4} = \frac{mL_1L_2}{L_1+L_2} \tag{6}$$
$$L_7 = \frac{L_4^2}{L_3+L_4} = \frac{mL_2^2}{L_1+L_2}$$

In the circuit of Fig. 8 is shown the bridged-T network equivalent to the lattice network of Fig. 7. The circuit comprises an additional inductance $L_8$, the value of which is given by the following equation:

$$L_8 = L_6 - L_5 = \frac{L_2}{m} \cdot \frac{(m^2-1)L_1 - L_2}{L_1+L_2} \tag{7}$$

Inductance $L_8$ may in some cases be negative, in which case it may be realized physically as the mutual inductance between two inductance elements.

Fig. 9 shows a circuit like that of Fig. 8, in which adjacent elements of similar kind have been combined to simplify the structure. In Fig. 10 there is shown a circuit which is the equivalent of that of Fig. 9, but in which inductances $L_9$, $L_9$ coupled by mutual inductance $M_9$ are utilized in place of inductances $L_5, L_5$ and inductance $L_8/2$ of the circuit of Fig. 9. The following equations apply to the circuit of Fig. 10:

$$L_9 = L_5 + \frac{L_8}{2} = \frac{L_2}{2m} \cdot \frac{(m^2+1)L_1 + L_2}{L_1 + L_2}$$

$$M_9 = \frac{L_8}{2} = \frac{L_2}{2m} \cdot \frac{(m^2-1)L_1 - L_2}{L_1 + L_2} \quad (8)$$

$$\frac{M_9}{L_9} = \frac{(m^2-1)L_1 - L_2}{(m^2+1)L_1 + L_2}$$

The last expression above represents the coefficient of coupling between the two inductances $L_9$, $L_9$. It is noted that the coefficient of coupling may be either positive or negative, but is always within the range between plus one and minus one. Therefore, this arrangement can be realized in a physical structure even when the parameter $m$ is greater than unity, as in accordance with the present invention.

Fig. 11 shows a modification of the circuit of Fig. 10 which is derived by a slightly different procedure requiring several steps, starting from the circuit of Fig. 6. The essential difference is that the amount of shunt inductance which is present in both inner and outer arms of Fig. 6 is taken out and replaced by shunt inductance across each pair of terminals. The remaining steps to arrive at the circuit of Fig. 11 are merely routine, so that they do not require description. They are essentially similar to the final steps required to arrive at the circuits of Figs. 9 and 10. The same comments apply to the derivation of the formulae for the additional elements of Fig. 11, so they need not be given here. The modified procedure yields, in Fig. 11, an inductance $L_{10}$ across each pair of terminals. The middle elements which differ from those of Fig. 10 are the inductances $L_{11}$, $L_{11}$ coupled by mutual inductance $M_{11}$ which may be positive or negative, depending on the design requirements.

In Fig. 12 there is shown a modification of the circuit of Fig. 11, in which transformers are employed wherever possible in order to give maximum freedom of design with regard to impedance levels. Fig. 12 is derived from Fig. 11 merely by substituting mutual inductances or transformers for the self-inductance elements of Fig. 11. With this explanation the derivation requires no unusual steps, so it is unnecessary to describe it in more detail or to give the resulting formulae.

Fig. 12 has five coupled tuned circuits. These circuits comprise two tuned circuits $C_4$, $L_{12}$ individually inductively coupled with tuned circuits $L_{13}$, $L_{14}$, $2C_8$ and tuned circuit $L_{15}$, $L_{15}$, $C_6/2$ inductively coupled to each of tuned circuits $L_{13}$, $L_{14}$, $2C_8$.

Any of the circuits of Figs. 8–12, inclusive, comprise unbalanced $m$-derived band-pass filter sections in which $m$ may be made greater than unity and it is apparent that further transpositions of the circuit elements may be made in many combinations without changing the inherent characteristics of the filter.

In order to provide a corresponding filter section having mid-series image impedance, the constant-$k$ prototype of Fig. 13 is utilized. Circuit elements in Fig. 13 which are similar to those of Fig. 1 are given the same letters and subscripts. The following formulae apply to the circuit of Fig. 13:

$$C_1 = \frac{\omega_2 - \omega_1}{\omega_1 \omega_2 R} \qquad C_2 = \frac{1}{(\omega_2 - \omega_1)R}$$

$$L_1 = \frac{R}{\omega_2 - \omega_1} \qquad L_2 = \frac{(\omega_2 - \omega_1)R}{\omega_1 \omega_2} \quad (9)$$

$$R = \sqrt{\frac{L_1}{C_2}} = \sqrt{\frac{L_2}{C_1}} \quad (10)$$

$$\omega_m = \sqrt{\omega_1 \omega_2} = \frac{1}{\sqrt{C_1 L_1}} = \frac{1}{\sqrt{C_2 L_2}} \quad (11)$$

The equivalent lattice network for the circuit of Fig. 13 is shown in Fig. 14. The circuit of Fig. 15 is similar to the circuit of Fig. 14 except that the lattice has been $m$-derived by multiplying the values of the outer-arm reactances by $m$ and the values of the inner-arm reactances by $1/m$. The image impedance of the section remains the same but the transfer characteristics are modified. The following formulae apply to the circuit of Fig. 15:

$$C_3 = \frac{C_1}{m} \qquad C_4 = mC_1 \qquad C_5 = mC_2$$

$$L_3 = mL_1 \qquad L_4 = \frac{L_1}{m} \qquad L_5 = \frac{L_2}{m} \quad (12)$$

Since $m$ is greater than unity, $L_3 > L_4$ and $C_3 < C_4$, the impedance comprising $C_4$ and $L_4$ in series with each of the terminal circuits may be taken out of the lattice. This is shown in the circuit of Fig. 16. The following formulae apply to the circuit of Fig. 16:

$$\frac{1}{C_6} = \frac{1}{C_3} - \frac{1}{C_4} = \left(m - \frac{1}{m}\right)\frac{1}{C_1}$$

$$C_6 = \frac{m}{m^2 - 1} C_1 \quad (13)$$

$$L_6 = L_3 - L_4 = \left(m - \frac{1}{m}\right)L_1 = \frac{m^2 - 1}{m} L_1$$

The lattice circuit of Fig. 16 cannot be developed further into a ladder or bridged-T equivalent. Therefore, in order further to develop the filter, the inner and outer arms of the lattice are interchanged, as shown in Fig. 17, in a manner similar to the interchange made effecting the circuit transformation from Fig. 5 to Fig. 6. The circuit of Fig. 18 is a bridged-T circuit equivalent to the circuit of Fig. 17. The following formula applies to the circuit of Fig. 18:

$$L_7 = L_6 - L_5 = \frac{m^2 - 1}{m} L_1 - \frac{1}{m} L_2 \quad (14)$$

If inductance $L_7$ is negative, it can be realized in one of the circuits of Figs. 20–22 having mutual inductance.

Adjacent circuit elements of similar kind in the circuit of Fig. 18 have been combined in the circuit of Fig. 19, while mutual inductance has been utilized to replace certain of the inductances of Fig. 19 in the circuit of Fig. 20. The following formulae apply to the circuit of Fig. 20:

$$M_5 = L_5 = \frac{L_2}{m}$$

$$M_8 = \frac{L_7}{2} = \frac{m^2 - 1}{2m} L_1 - \frac{1}{2m} L_2$$

$$L_8 = L_4 + L_5 + \frac{L_7}{2} = \frac{m^2 + 1}{2m} L_1 + \frac{1}{2m} L_2 \quad (15)$$

$$\frac{M_8}{L_8} = \frac{(m^2 - 1)L_1 - L_2}{(m^2 + 1)L_1 + L_2}$$

The last expression represents the coefficient of coupling between the inductances $L_8$, $L_8$ and is the same as the expression for coefficient of coupling given by Equations (8) for the circuit of Fig. 10. It may be positive or negative but it is always within a range that can be realized in a physical structure. The following expression represents the coefficient of coupling in each set of inductances $L_5$, $L_8$ coupled by mutual inductance $M_5$:

$$\frac{M_5}{\sqrt{L_5 L_8}} = \sqrt{\frac{2L_2}{(m^2+1)L_1+L_2}} \quad (16)$$

There are some conditions under which this coefficient of coupling may exceed unity, in which case this arrangement could not be realized exactly as shown. Figs. 21 and 22 represent electrical equivalents of the circuit of Fig. 19 which can always be physically realized.

Fig. 21 shows a modification of the circuit of Fig. 19 in which the self-inductance $L_7/2$ is replaced by the mutual inductance $M_9$ between the inductances $L_9$, $L_9$. The formulae for the new circuit elements in Fig. 21 are as follows:

$$L_9 = L_5 + \frac{L_7}{2} = \frac{m^2-1}{2m}L_1 + \frac{1}{2m}L_2$$

$$M_9 = M_8 = \frac{m^2-1}{2m}L_1 - \frac{1}{2m}L_2 \quad (17)$$

$$\frac{M_9}{L_9} = \frac{(m^2-1)L_1 - L_2}{(m^2-1)L_1 + L_2}$$

The last expression represents the coefficient of coupling between inductances $L_9$, $L_9$. It is always within the range between plus one and minus one, which can be realized in a physical structure.

Fig. 22 shows another modification derived from Fig. 19. The method of deriving the circuit of Fig. 22 is only slightly different from that of Fig. 21. The modified elements include only the inductance $L_{10}$ and condenser $C_7$ connected in series. Their values are given by the following formulae:

$$C_7 = \frac{C_5}{2}\left(\frac{L_5}{L_4+L_5}\right)^2 = \frac{mC_2}{2}\left(\frac{L_2}{L_1+L_2}\right)^2$$

$$L_{10} = \frac{2L_4(L_4+L_5)}{L_5} = \frac{2L_1(L_1+L_2)}{mL_2} \quad (18)$$

The coefficient of coupling in this circuit is the same as that of Figs. 10 and 20.

It appears, on closer inspection, that the circuit of Fig. 22 is exactly analogous to that of Fig. 10 except for the interchange of series and parallel elements. For example, the series inductance $L_{10}$ and condenser $C_7$ of Fig. 22 are analogous to th parallel inductance $L_7/2$ and condenser $2C_7$ of Fig. 10; likewise the parallel condenser $2C_6$ of Fig. 22 is analogous to the series condenser $C_6/2$ of Fig. 10. The total number of elements in these two figures is the same. They have the same transfer characteristics (attenuation and phase angle) and differ in performance only in that the circuit of Fig. 10 has image impedance of the mid-shunt constant-$k$ form, while the circuit of Fig. 22 has image impedance of the mid-series constant-$k$ form.

A particular advantage of the circuits of Figs. 10 and 11, which is of value in building practical networks, is that the circuit includes capacitance to ground from all ungrounded terminals of the inductances. Therefore, inherent capacitance of inductances and shielding can be included as part of the elements of the filter and is not a disturbing factor.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A band-pass filter section comprising input and output terminals, said filter section being adapted for unbalanced operation and being $m$-derived from a prototype including input and output terminals, said prototype comprising half-sections each including a mid-series arm having impedance of value $Z_1$, which is primarily reactance of any form, and a mid-shunt arm having impedance of value $Z_2$ so related to $Z_1$ that the product $Z_1 Z_2$ is constant, the value of $m$ in the derivation being greater than unity, and the polarity of one of said terminals of said filter section being reversed with respect to that of the corresponding terminals of said prototype.

2. A band-pass filter section adapted for unbalanced operation and having input and output terminals, said section having mid-series image impedance across said terminals and being $m$-derived from a prototype including input and output terminals, said prototype comprising half-sections each including mid-series terminal arms having impedance of value $Z_1$, which is primarily reactance of any form, and a mid-shunt arm having impedance of value $Z_2$ so related to impedance $Z_1$ that the products $Z_1 Z_2$ is constant, the value of $m$ in the derivation being greater than unity, and the polarity of one of said terminals of said section being opposite to that of the corresponding terminals of said prototype.

3. A band-pass filter section adapted for unbalanced operation and having input and output terminals, said section having mid-shunt image impedance across said terminals and being $m$-derived from a prototype having input and output terminals, said prototype comprising half-sections each including a mid-series arm having impedance of value $Z_1$, which is primarily reactance of any form, and mid-shunt terminal arms having impedance of value $Z_2$ so related to impedance $Z_1$ that the product $Z_1 Z_2$ is constant, the value of $m$ in the derivation being greater than unity, and the polarity of one of said terminals of said section being opposite to that of the corresponding terminals of said prototype.

4. A band-pass filter section comprising input and output terminals and being adapted for unbalanced operation, said section being $m$-derived from a prototype having input and output terminals with mid-series image impedance including a mid-series terminal arm comprising series-connected inductance and capacitance having impedance of value $Z_1$ and a mid-shunt arm comprising parallel-connected inductance and capacitance providing impedance of value $Z_2$ so related to impedance $Z_1$ that the product $Z_1 Z_2$ is constant, the value of $m$ in the derivation being greater than unity, the polarity of one of said terminals of said resultant filter section being reversed with respect to that of the corresponding terminals of said prototype.

5. A band-pass filter section having input and output terminals and being adapted for unbalanced operation, said section being $m$-derived from a prototype having input and output terminals with mid-shunt image impedance, said prototype including a mid-series arm comprising series-connected inductance and capacitance having impedance of value $Z_1$ and a mid-shunt terminal arm comprising parallel-connected inductance and capacitance providing impedance of value $Z_2$ so related to impedance $Z_1$ that the product $Z_1Z_2$ is constant, the value of $m$ in the derivation being greater than unity, the polarity of one of said terminals of said resultant filter section being reversed with respect to that of the corresponding terminals of said prototype.

6. An unbalanced band-pass filter section comprising input and output pairs of terminals, said filter having mid-shunt image impedance across each of said pairs of terminals, shunt terminal condensers, a series arm comprising two series-connected and inductively coupled inductances connected in parallel with a condenser, and a shunt arm comprising a parallel-connected inductance and condenser connected to the common terminal of said inductively coupled inductances, said section being $m$-derived from a constant-$k$ prototype section, the value of $m$ in the derivation being greater than unity.

7. An unbalanced band-pass filter section comprising input and output pairs of terminals, said filter having mid-series image impedance across each of said pairs of terminals, said section comprising capacitance in series with each of said pairs of terminals and having a series arm comprising two series-connected and inductively coupled inductances connected in parallel with series-connected inductance and capacitance, and a shunt arm comprising a capacitance connected to the common terminal of said coupled inductances, said filter section being $m$-derived from a constant-$k$ prototype section, the value of $m$ in the derivation being greater than unity.

HAROLD A. WHEELER.